United States Patent [19]

Tsutsui et al.

[11] Patent Number: 5,752,775
[45] Date of Patent: May 19, 1998

[54] ROLLER BEARING

[75] Inventors: Akira Tsutsui, Yokkaichi; Kimihiro Hanai; Yasuhiro Shimizu, both of Kuwana, all of Japan

[73] Assignee: NTN Corporation, Osaka, Japan

[21] Appl. No.: 520,438

[22] Filed: Aug. 29, 1995

[30] Foreign Application Priority Data

Aug. 31, 1994 [JP] Japan ................................. 6-206464
May 26, 1995 [JP] Japan ................................. 7-128362

[51] Int. Cl.$^6$ ................................................. F16C 33/36
[52] U.S. Cl. ............................................................ 384/568
[58] Field of Search ................................. 384/548, 565, 384/568; 29/898.068; 451/49, 541

[56] References Cited

U.S. PATENT DOCUMENTS 4,456,313  6/1984  Hartnett et al. ..................... 384/565
4,929,098  5/1990  Takata et al. .................... 384/568 X

FOREIGN PATENT DOCUMENTS 903321  9/1945  France ................................. 384/568
485813  5/1938  United Kingdom .................. 384/565

Primary Examiner—Thomas R. Hannon
Attorney, Agent, or Firm—Nikaido, Marmelstein, Murray & Oram LL)

[57] ABSTRACT

The boundary between the rolling surface 3a and the larger end surface 3b of a roller 3 and the boundary between the rolling surface 3a and the smaller end surface 3c are formed with rounded portions Rb and Rc, respectively. The rolling surface 3a and the rounded portion Rb associated with the larger end surface 3b are smoothly continuous with each other through a first arc R1, while the larger end surface 3b and the rounded portion Rb are smoothly continuous with each other through a second arc R2.

5 Claims, 6 Drawing Sheets

ROLLER BEARING

BACKGROUND OF THE INVENTION

The present invention relates to a roller bearing, such as a self-aligning roller bearing or a tapered roller bearing, and particularly it relates to rollers assembled into such roller bearing.

As an example of a roller bearing, a conventional self-aligning roller bearing is shown in FIG. 4. This self-aligning roller bearing is of the type In which rollers 3' are contacted and guided by a center rib 2a' integrally formed on an inner ring 2, comprising an outer ring 1 having a spherical raceway surface, an inner ring 2 having double row raceway surfaces, a plurality of barrel-shaped rollers 3' interposed between the inner ring 2 and the outer ring 1, and a retainer 4 for holding the rollers 3' at circumferentially equal intervals.

The rollers 3' assembled between the inner and outer rings 2 and 1, as shown enlarged in FIG. 5, have a larger diameter (larger end surface 3'b) at the end surface associated with the bearing center and a smaller diameter (smaller end surface 3'c) at the bearing end side and, therefore, the rollers 3', subjected to a force directed to the bearing center from the raceway surfaces, roll while being guided by the center rib 2a of the inner ring. The rolling surface 3'a of the roller 3' is a spherical surface having a curvature corresponding to the raceway surface of the outer ring 1; the larger end surface 3'b is a spherical surface having a curvature greater than the rolling surface 3'a; and the smaller end surface 3'c is a flat surface.

The reason for making the larger end surface 3'b spherical is to reduce the slide friction due to contact with the center rib 2a and for other purposes. Further, the boundary between the rolling surface 3'a and the larger end surface 3'b and the boundary between the rolling surface 3'a and the smaller end surface 3'c are rounded as at Rb' and Rc' for purposes including prevention of edge loading. In addition, in the same figure, the difference in diameter between the larger and smaller end surfaces 3'a and 3'c is shown exaggerated.

Conventionally, in processing the roller 3'a described above, a method has been employed which comprises the steps of forming the rounded portion Rb' by lathing, forming the rolling surface 3'a and the larger end surface 3'b by grinding, and, as shown enlarged in FIG. 6, forming the boundary portion E2 between the rolling surface 3'a and the rounded portion Rb' and the boundary portion E2 between the larger end surface 3'b and the rounded portion Rb' by tumbling.

According to the conventional processing method, however, as shown enlarged in FIG. 7, the boundary portions E1 and E2 have edges (E1a, E1b, E2a, E2b) left thereon, so that there has been a danger of the raceway surface of the inner ring 2 being damaged by the edges (E1a, E1b) of the boundary portion E1. Further, there has also been a fear that during rotation of the bearing, the oil film on the portion in contact with the center rib 2a may be more easily broken by the edges (E2a, E2b) of the boundary portion E2. Further, according to the conventional processing method, the griding of the rolling surface 3'a and the grinding of the larger end surface 3'b have to be separately performed and, furthermore, tumbling is effected upon completion of the grinding; therefore, the processing is complicated, and much remains to be Improved from the viewpoint of process control.

FIGS. 8 (a) and (b) show a conventional tapered roller bearing. This tapered roller bearing has a plurality of tapered rollers 4" held by inner and outer rings 1' and 2' and a retainer 3', said inner and outer rings 1' and 2' having tapered raceway surfaces 5 and 6 at their opposed surfaces, said tapered raceway surface 5 of the inner ring 1' being formed at the opposite ends thereof with a larger diameter flange 8 and a smaller diameter flange 9.

The roller 4", as shown in FIG. 8 (b), is formed with a rounded portion 14 between the rolling surface 12 and the end surface 13. The center 0 for the radius of curvature, R, of the rounded portion 14 is located inwardly of the boundary section 15 between the rolling surface 12 and the rounded portion 14 and on a radius smaller than the radius r of the end surface 13. The term "boundary section" used herein refers to a section taken in a plane containing the boundary line at right angles to the centerline.

As described above, since the center 0 for the radius of curvature R of the rounded portion 14 is at a position deviated from the boundary section 15 between the rolling surface 12 and the end surface 13, the two surfaces are not smoothly continuous with each other, producing an edge 16 on the outer periphery of the boundary section. Generally, in the production process for the rollers 4", the center of the curvature of radius R of the rounded portion 14 is on the boundary surface 15 and hence the rolling surface 12 and the end surface 13 are smoothly continuous.

However, as a result of the rolling surface 12 being ground in the grinding step, the edge 16 as described above appears, and as such the rollers are built into a bearing for use.

If an excessive moment load acts on such roller bearing, a problem arises, as shown in FIG. 9 (b), that during assembling operation, the rollers 4" are bombarded at their edges, producing a concentrated load on the edge 16. Further, if the rollers are assembled in the Inclined state during assembling operation as shown in FIG. 9 (b), there is a possibility that the rolling surface 6 of the outer ring 2 is bruised by the edges 16.

The problems described above are common with roller bearings in general, whether they are self-aligning roller bearings or tapered roller bearings.

SUMMARY OF THE INVENTION

An object of the present invention is to eliminate the stress concentration on the edges of rollers, prolonging their life and improving the quality of rollers and to simplify the processing steps.

To achieve the object, the present invention provides a roller for roller bearing having a rounded portion between a rolling surface and the end surface, wherein the rolling surface and the rounded portion are made smoothly continuous with each other by a first arc portion and the end surface and the rounded portion are made smoothly continuous with each other by a second arc portion. The roller for roller bearings of this invention is so designed that the rolling surface and the rounded portion are made smoothly continuous with each other by a first arc portion and the end surface and the rounded portion are made smoothly continuous with each other by a second arc portion, with no edge left on the boundary portion associated with the end surface. Therefore, according to this invention, the fear of the raceway surface being damaged by such edge during assembly of rollers or of the oil film being broken is eliminated, thus improving the quality of the roller bearing.

The roller for roller bearings arranged in the manner described above can be produced by simultaneously grinding the rolling surface, end surface and rounded portion of the roller by using a grinding stone comprising an outer grinding portion for grinding the rolling surface of the roller, an end grinding portion for grinding the end surface of the roller, a rounded grinding portion for grinding the rounded portion of the roller, a first arc grinding portion for smoothly connecting the outer grinding portion and rounded grinding portion by a curvature corresponding to the first arc portion of the roller, and a second arc grinding portion for smoothly connecting the end grinding portion and the rounded grinding portion by a curvature corresponding to the second arc portion of the roller. Simultaneous grinding of the rolling surface, the end surface and the rounded portion of the roller by using the grinding stone as described above ensures precision processing of the roller (according to the conventional tumbling, the boundary portion associated with the rounded portion can hardly be finished with high precision). Further, the grinding of the rolling surface and larger end surface can be effected in the same processing step, and since tumbling after completion of grinding is unnecessary, the processing steps can be simplified.

Further, to achieve the above object, the present invention provides a roller bearing wherein a plurality of ground rollers held by a retainer are disposed between an inner ring and an outer ring and a rounded portion is formed between a rolling surface and the end surface of the roller, wherein the center of the radius of curvature of the rounded portion lies on the boundary section between the rolling surface and the rounded portion of the roller.

In the roller bearing of this invention, the boundary portion between the rolling surface and the rounded portion is smoothly continuous. While the continuous state of the boundary portion between the rounded portion and the end surface is not limited, if the radius from the roller centerline at the center point for the radius of curvature of the rounded portion coincides with the radius of the end surface of the roller, then the boundary portion between the rounded portion and the end surface is smoothly continuous. However, if the radius from the roller centerline at the center point for the radius of curvature of the rounded portion is smaller than the radius of the end surface of the roller, then the edge remains on said boundary portion.

Further, in order to achieve said object, the present invention provides a roller bearing wherein a plurality of ground rollers held by a retainer are disposed between an inner and an outer ring and a rounded portion is formed between a rolling surface and the end surface of the rollers, wherein the rounded portion is formed by a rolling surface-associated rounded portion and an end surface-associated rounded portion, the center point for the radius of curvature of the rolling surface-associated rounded portion lying on the boundary section between the rolling surface and the rolling surface-associated rounded portion, the center of the radius of curvature of the end surface-associated rounded portion lying on the boundary section between the end surface and the end surface-associated rounded portion of the roller. In this arrangement, the boundary portion between the rolling surface and the rolling surface-associated rounded portion, and the boundary portion between the end surface and the end surface-associated rounded portion are each smoothly continuous.

DESCRIPTION OF THE PREFERRED EMBODIMENTS

Figure 1A:
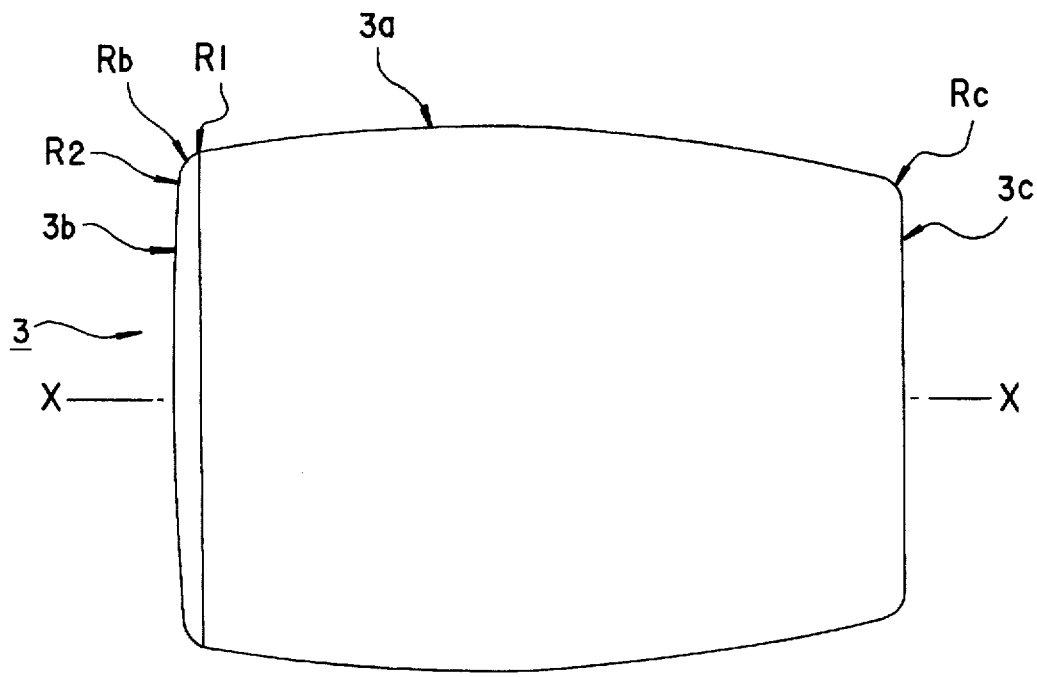
FIG. 1 is a side view of a roller for self-aligning roller bearings according to an embodiment of the present invention {FIG. 1 (a)} and an enlarged side view showing the vicinity of a rounded portion of the roller {FIG. 1 (b)}.
Figure 1B:
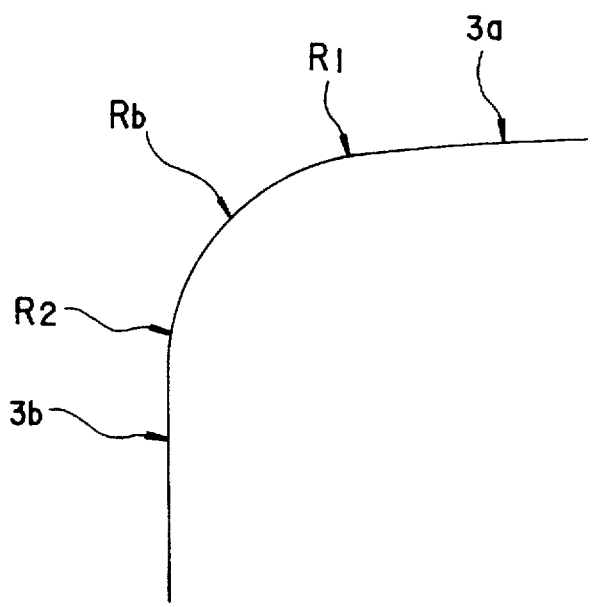
Figure 4:
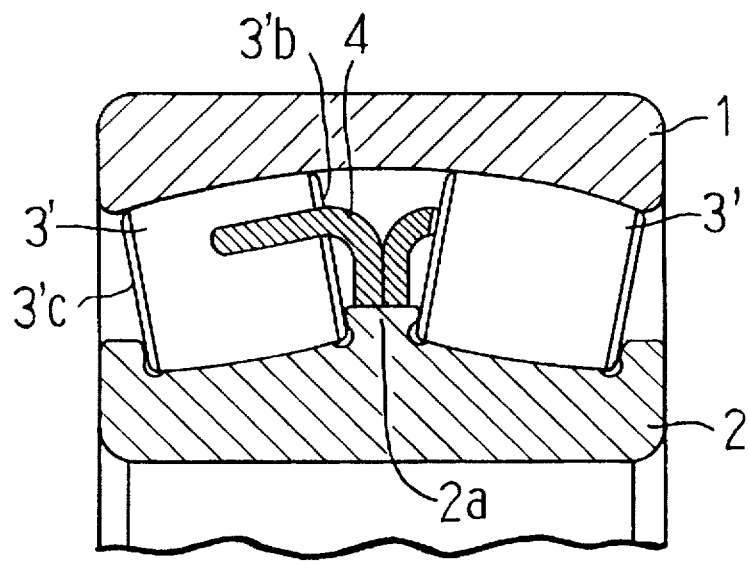
FIG. 4 is a sectional view of a self-aligning roller bearing.
Figure 5:
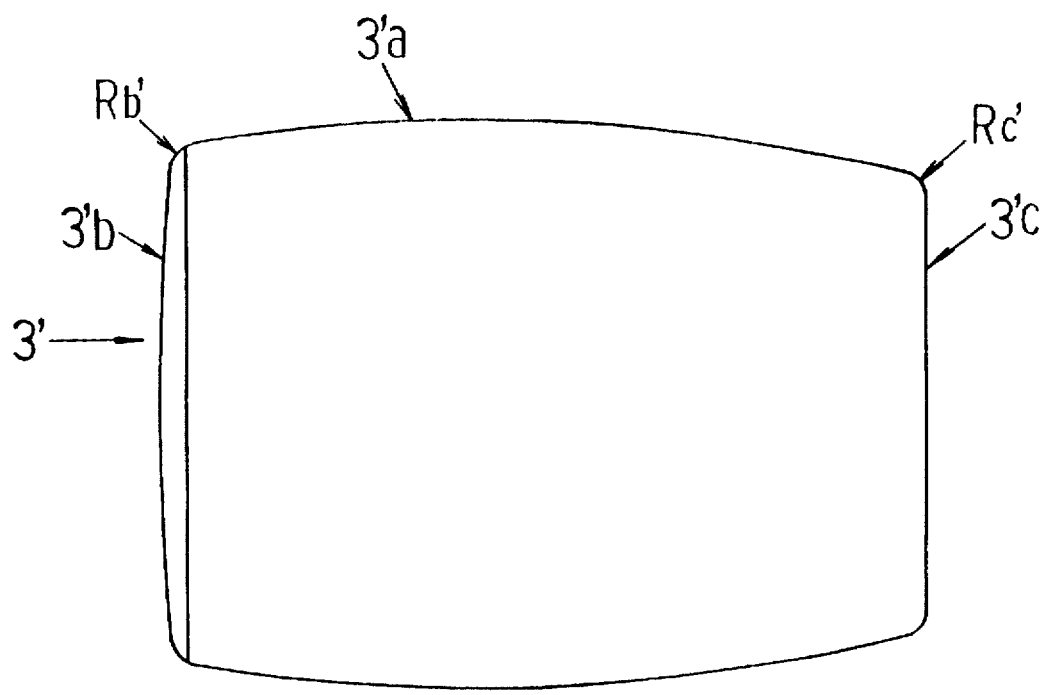
FIG. 5 is a side view of a roller for conventional self-aligning roller bearings.
Figure 6:
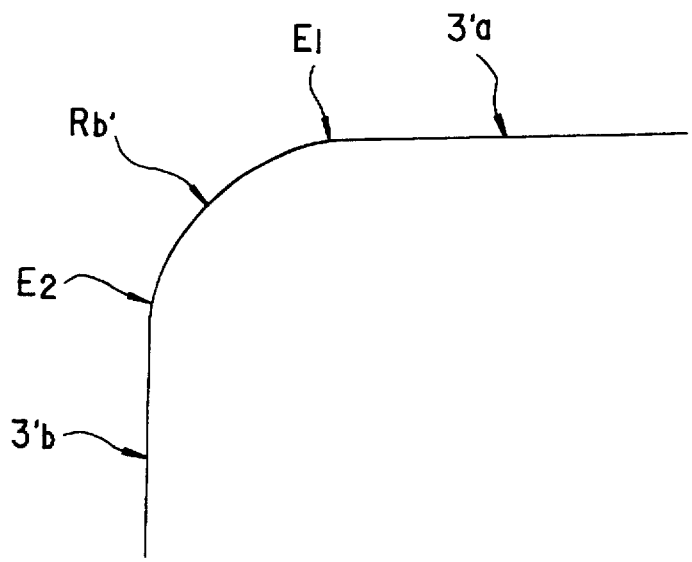
FIG. 6 is an enlarged side view showing the vicinity of a rounded portion of a roller for conventional self-aligning roller bearings.
Figure 7A:
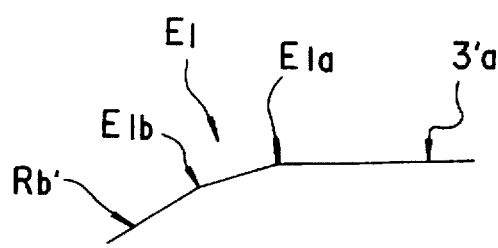
FIG. 7 is an enlarged side view showing the boundary portion; relative to the rounded portion in FIG. 6.
Figure 7B:
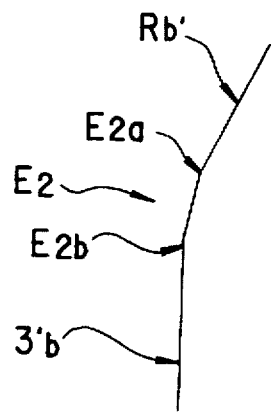

Embodiments of the invention will now be described. A roller 3 shown in FIG. 1 is one to be assembled Into a self-aligning roller bearing as shown in FIG. 4. The rolling surface 3a of the roller 3 is a spherical surface having a curvature corresponding to the raceway surface of the outer ring 1 shown in FIG. 4, and the larger end surface 3b is a spherical surface having a curvature greater than the rolling surface 3a, and the smaller end surface 3c is a flat surface. The boundary between the rolling surface 3a and the larger end surface 3b, and the boundary between the rolling surface 3a and the smaller end surface 3c have rounded portions Rb and Rc formed thereon, respectively. As shown enlarged in FIG. 1b, the rolling surface 3a and the rounded portion Rb associated with the larger end surface 3b are smoothly continuous with each other through a first arc portion R1, while the larger end surface 3b and the rounded portion Rb are smoothly continuous with each other through a second arc portion R2. The radii of curvature of the first and second arc portion R1 and R2 are each about 0.01 Ro–0.04 Ro where Ro is the maximum diameter of the roller.

Figure 2A:
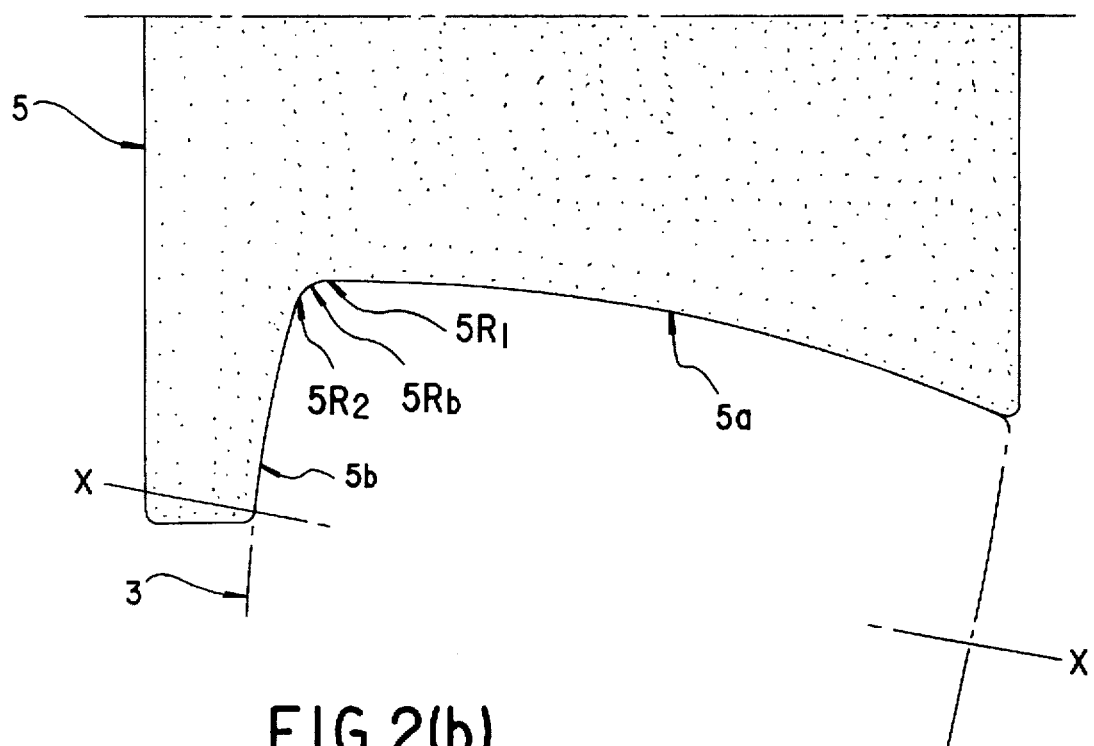
FIG. 2 is a sectional view of a grinding stone according to a embodiment of the invention {FIG. 2 (a)} and an enlarged sectional view showing the vicinity of a rounded portion grinding portion thereof {FIG. 2 (b)}.
Figure 2B:
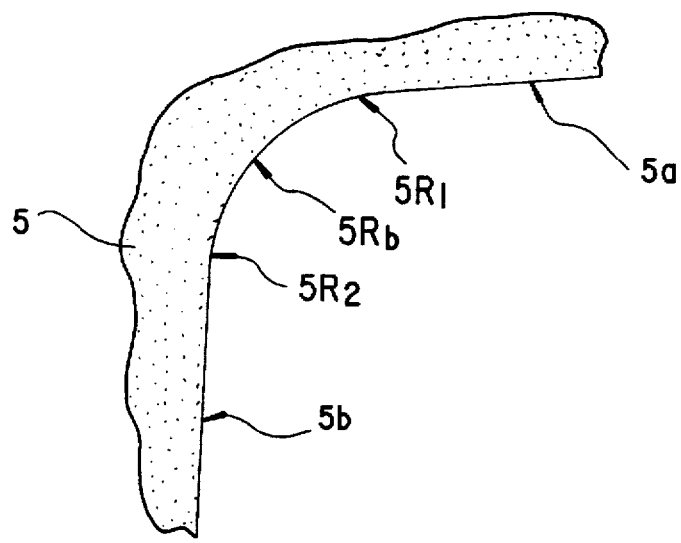
Figure 3A:
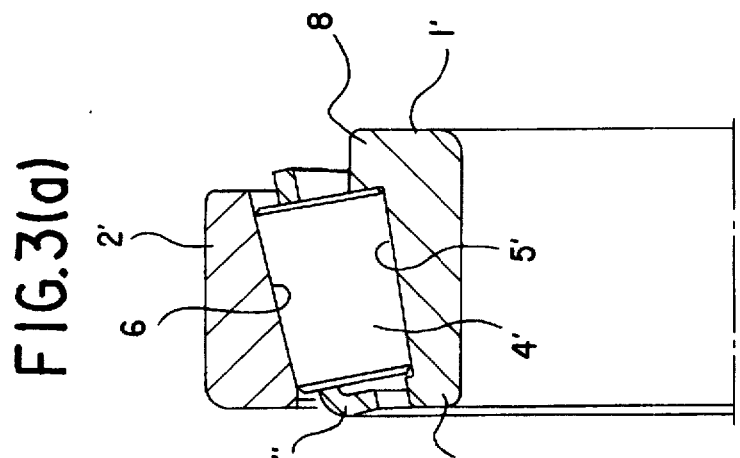
FIG. 3 is a sectional view of a tapered roller bearing according to an embodiment of the invention {FIG. 3 (a)} and an enlarged side view showing the vicinity of a rounded portion of roller {FIG. 3 (b) through FIG. 3 (d)}.
Figure 3B:
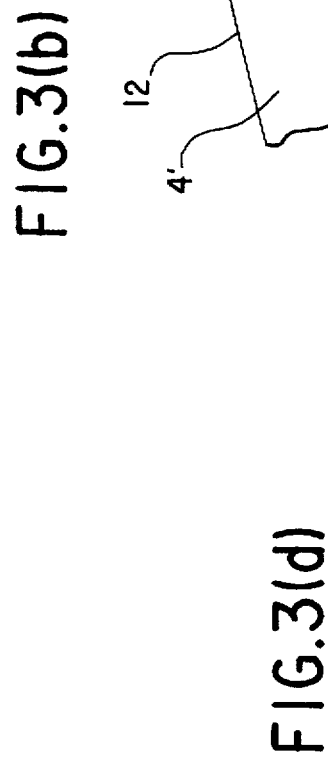
Figure 3C:
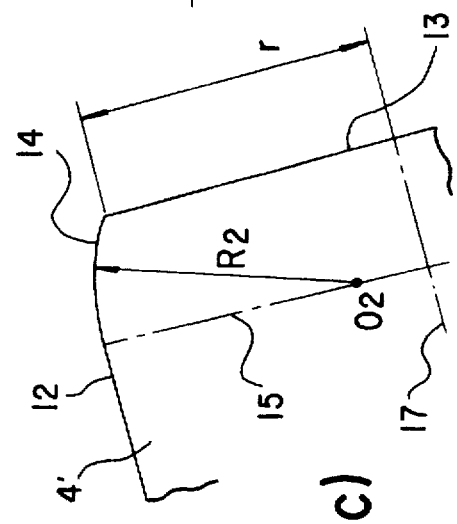
Figure 3D:
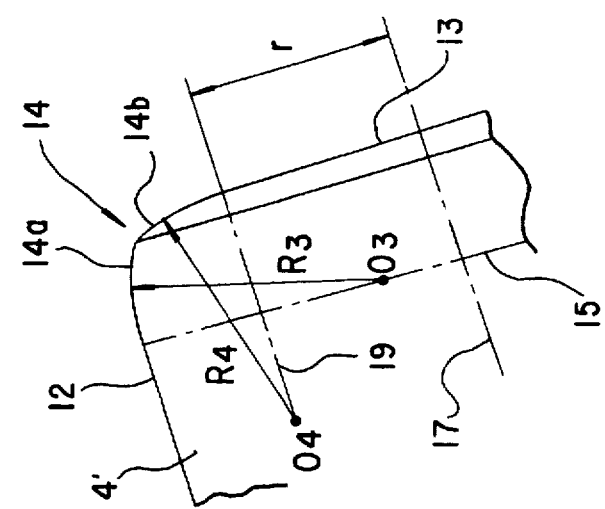

FIG. 2 shows a grinding stone 5 for processing the roller described above. This grinding stone 5 comprises an outer grinding portion 5a for grinding the rolling surface 3a of the roller 3, a larger end grinding portion 5b for grinding the larger end 3b, a rounded grinding portion 5Rb for grinding the rounded portion Rb, a first arc grinding portion 5R1 for smoothly connecting the outer grinding portion 5a and rounded grinding portion 5Rb by a curvature corresponding to the first arc portion R1, and a second arc grinding portion 5R2 for smoothly connecting the larger end grinding portion 5b and rounded grinding portion 5Rb by a curvature corresponding to the second arc portion R2. The axial length of the outer grinding portion 5a is substantially equal to or greater than the axial length of the rolling surface 3a of the roller 3, while the radial length of the larger end grinding portion 5b is substantially equal to or greater than the radius of the larger end surface 3b of the roller 3.

Using the grinding stone described above, the rolling surface 3a, larger end surface 3b and rounded portion Rb of the roller 3 which has been formed in a predetermined shape as by lathing are simultaneously ground. As compared with the conventional processing method, the processing time can be greatly reduced and there is no edge left on the boundary portion associated with the rounded portion Rb. After completion of grinding, the rolling surface 3a and larger end surface 3b are superfinished.

Figure 8A:
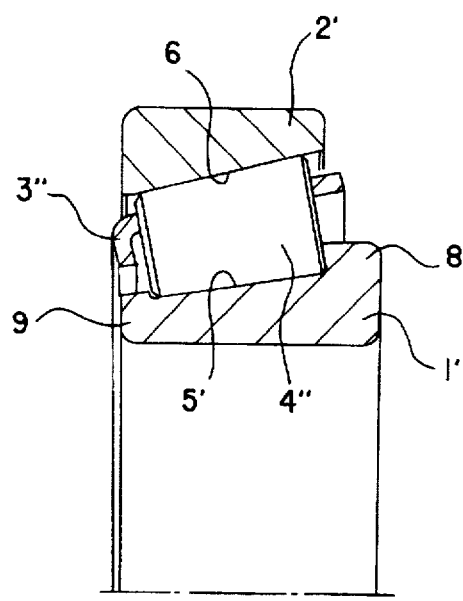
FIG. 8 is a sectional view of a conventional tapered roller bearing {FIG. 8 (a)}, and an enlarged sectional view showing the vicinity of a rounded portion of a roller {FIG. 8(b)}.
Figure 8B:
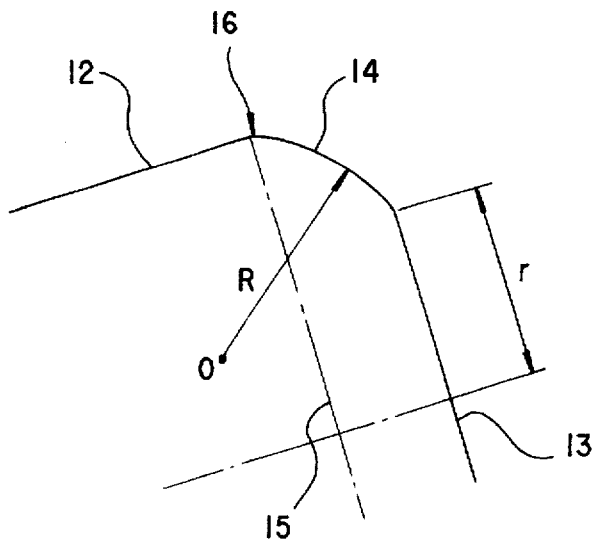
Figure 9B:
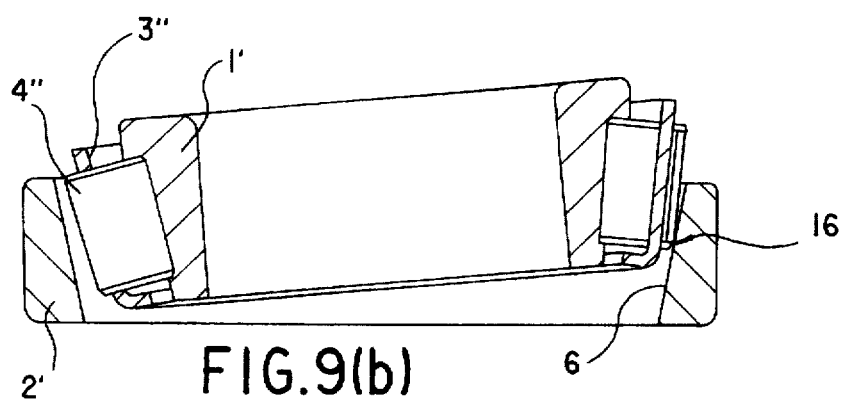
FIG. 9 is a sectional view showing the operating state of a conventional tapered roller bearing {FIG. 9 (a)} and a sectional view showing a midway stage in assembly operation {(FIG. 9 (b)}.
Figure 9A:
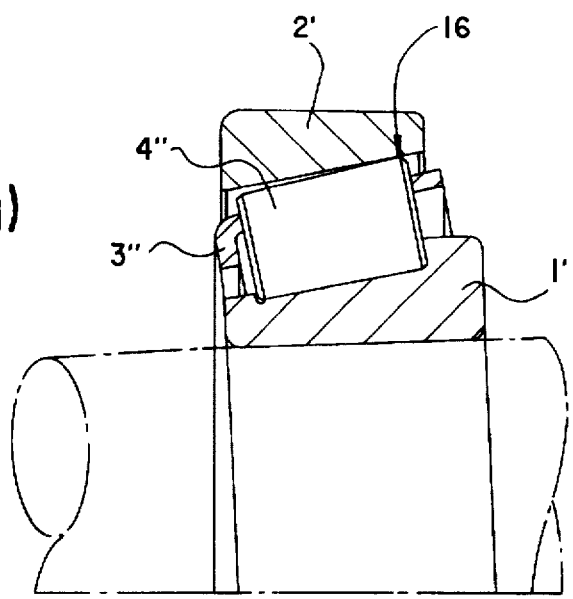

FIG. 3 shows a tapered roller bearing according to an embodiment. In addition, since the basic construction of this tapered roller bearing is the same as the conventional one, the same portions as those shown in FIG. 8 are denoted by the same reference characters and a description thereof is omitted.

The difference of the tapered roller bearing of this embodiment from the conventional arrangement resides in the shape of the roller 4'. The roller 4' has been ground, and the shape of its rounded portion 14 may, besides the one shown in FIG. 3 (b), one shown in (c) or (d) in the same figure.

The relation between the rounded portion 14 and the rolling surface 12 of the roller 4' shown in FIG. 3 (b) is such that the center point $0_1$ for the radius of curvature $R_1$ of the rounded portion 14 lies on the boundary section 15 between the rolling surface 12 and the rounded portion 14 and on a radius which coincides the radius r of the end surface 13 from the centerline 17 of the roller 4'.

Therefore, the tangent 18 to the rounded portion 14 in the boundary section 15 coincides with an extension of the rolling surface 12. That is, the rounded portion 14 is smoothly continuous with the end surface 13. Further, the tangent 18' to the boundary portion between the end surface 13 and the rounded portion 14 coincides with an extension of the end surface 13. That is, the end surface 13 and the rounded portion 14 are smoothly continuous with each other.

The shape shown in FIG. 3 (c) is such that the center point $0_2$ for the radius of curvature $R_2$ of the rounded portion 14 lies on the boundary section 15 as in the above, and the rolling surface 12 and the rounded portion 14 are smoothly continuous with each other. However, since the center point $0_2$ lies on a radius smaller than the radius r of the end surface 13, the edge remains on the boundary portion between the end surface 13 and the rounded portion 14.

The shape shown in FIG. 3 (d) is such that the rounded portion 14 comprises the two surfaces of a rolling surface-associated rounded portion 14a and an end surface-associated rounded portion 14b. The center point $0_3$ for the radius of curvature $R_3$ of the rolling surface-associated, as in the arrangement shown in FIG. 3 (c), lies on the boundary section 15 between the rolling surface 12 and the rolling surface-associated rounded portion 14a and is set at a position where it falls short of the radius r of the end surface 13. Further, the center point $0_4$ for the radius of curvature $R_4$ of the end surface-associated rounded portion 14b lies on the boundary plane 19 between the end surface 13 and the end surface-associated rounded portion 14b and inwardly of said boundary section 15. In this case, the end surface 13 and the end surface-associated rounded portion 14b are smoothly continuous with each other, but edges form on both rounded portions 14a and 14b.

The rollers 4' shown in FIG. 3 (b)–(d) are selectively employed according to uses, and in each case, smooth continuity is attained in the boundary portion between the rolling surface 12 and the rounded portion 14.

Further, the rollers 4' shown in FIG. 3 (b)–(d) are ground by grinding stones matching their respective shapes, and have their respective shapes upon completion of grinding.

In addition, while the above embodiments relate to self-aligning roller bearings and tapered roller bearings, the present invention is not limited thereto and is applicable to roller bearings in general.

What is claimed is:

1. A roller for a roller bearing comprising a rounded chamfer between a rolling surface and an end surface, wherein the rolling surface and the rounded chamfer are made smoothly continuous with each other through a first arc portion and the end surface and the rounded chamfer are made smoothly continuous with each other through a second arc portion.

2. A roller bearing comprising an inner ring, an outer ring, and a plurality of ground rollers held by a retainer and interposed between the inner ring and the outer ring, wherein each roller has a rounded chamfer between a rolling surface and an end surface of the roller, and wherein a center point for a radius of curvature of the rounded chamfer lies on a boundary section between the rolling surface and the rounded chamfer.

3. A roller bearing as set forth in claim 2, wherein a distance measured from a roller centerline to the center point for the radius of curvature of the rounded chamfer coincides with a radius of the end surface.

4. A roller bearing as set forth in claim 2, wherein a distance measured from a roller centerline to the center point for a radius of curvature of the rounded chamfer is smaller than the radius of the end surface.

5. A roller bearing comprising an inner ring, an outer ring and a plurality of ground rollers held by a retainer an interposed between the inner ring and the outer ring, wherein each roller has a rounded chamfer between a rolling surface and an end surface of the roller, wherein the rounded chamfer is formed by a rolling surface-associated rounded portion and an end surface-associated rounded portion, and wherein a center point for a radius of curvature of the rolling surface-associated rounded portion lies on a boundary section between the rolling surface and the rolling surface-associated rounded portion and a center point for a radius of curvature of the end surface-associated rounded portion lies on a boundary between the end surface and the end surface-associated rounded portion.

* * * * *